Jan. 9, 1962 R. D. STACKHOUSE 3,016,311
HIGH TEMPERATURE COATINGS AND BODIES
Filed Dec. 17, 1958
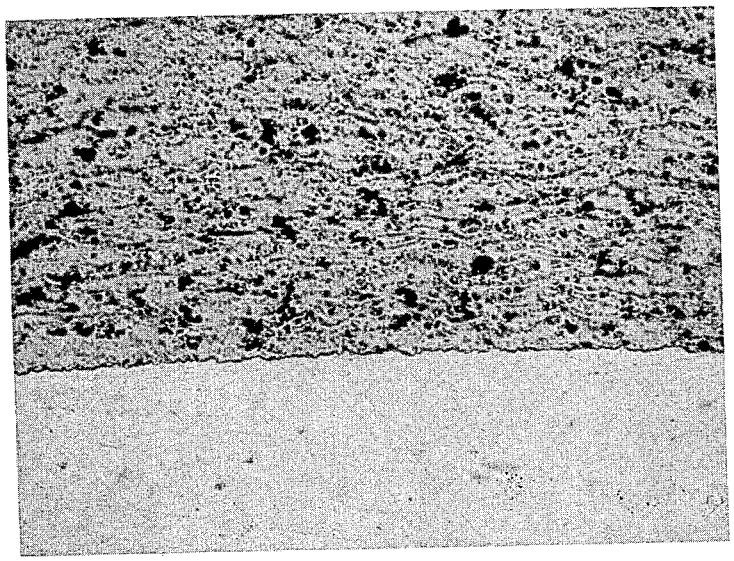
INVENTOR.
ROBERT D. STACKHOUSE
BY
Richard S. Shreve
ATTORNEY

United States Patent Office 3,016,311
Patented Jan. 9, 1962

3,016,311
HIGH TEMPERATURE COATINGS AND BODIES
Robert D. Stackhouse, Indianapolis, Ind., assignor to Union Carbide Corporation, a corporation of New York
Filed Dec. 17, 1958, Ser. No. 780,944
22 Claims. (Cl. 117—105)

This invention relates to a novel composition of matter and to bodies and coatings formed therefrom, such bodies and coatings having high oxidation resistance, erosion resistance, and thermal shock resistance at elevated temperatures.

There is a need in industry for materials that can withstand severe high temperature conditions. In particular, the aircraft and missile industries require items such as rocket nozzles that can withstand rapid disintegration caused by high temperature thermal shock or flame erosion. Attempts have been made in the past to meet these requirements by constructing the nozzles of graphite to take advantage of its good physical properties at high temperature. However, graphite does not have the ability to withstand the surface erosion and thermal shock conditions created by extremely hot combustion gases.

Among the most promising materials suitable for the rigorous requirement of missiles and rockets are the refractory metals, alloys or compounds, such as tungsten, zirconia and alumina. Generally, however, these materials are rapidly oxidized or are subject to severe spalling far below the required service conditions.

It is therefore an important object of the present invention to provide a novel composition of matter capable of being formed into an article exhibiting high oxidation resistance, thermal shock resistance, erosion resistance and other desirable characteristics at elevated temperatures.

Another object of the present invention is to provide an improved formed article exhibiting high oxidation resistance, thermal shock resistance, and erosion resistance at elevated temperature.

Yet another object of the present invention is to provide an improved coated article comprising a body having mechanically bonded thereto an impacted lamellar coating exhibiting high oxidation resistance, thermal shock resistance, and erosion resistance at elevated temperatures.

Other objects, features and advantages of the invention will be apparent from the following detailed description of certain preferred embodiments thereof.

The objects of the invention may be achieved in general by a novel composition of matter comprising tungsten and a refractory metal oxide, preferably zirconia and/or alumina, mixed in certain prescribed proportions. The novel composition of matter may be utilized to form articles or as protective coatings for base materials.

The composition of matter in the present invention comprises a mixture consisting essentially of tungsten and a refractory oxide of zirconia and/or alumina, the refractory oxide constituting between 5 and 60 weight percent of the mixture.

In the drawing the single figure is a photomicrograph of the composition.

The novel composition of the invention enables rocket nozzles, for example, to successfully stand up under service conditions which heretofore have created severe damage due to high temperature thermal shock and erosion. In applying the composition of this invention as a protective coating on an article, a preferred composition with respect to high temperature oxidation and erosion resistance is one containing about 40 to 60 weight percent zirconia and the remainder tungsten with 50 weight percent zirconia being especially useful. Zirconia is usually preferred over other refractory metal oxides because it has a higher melting point. The protective qualities of bodies or coatings formed by the composition of the invention appear to increase as the oxide content is increased up to about 50 weight percent. Above this value the protective qualities begin to decrease. If more than 60 weight percent refractory metal oxide is used, the metal content becomes too low to help protect against thermal shock. About 25 weight percent has been found to be an optimum level when alumina is used in place of zirconia in such bodies or coated bodies. The preferred range for a tungsten-alumina mixture is 5–35% alumina and the remainder tungsten.

Excellent results have also been obtained with 10 weight percent zirconia and 90 weight percent of tungsten as shown in Example II. The coating thus formed has very good thermal shock resistance and very good flame erosion resistance enabling it to be probably the most widely useful form of the new coating composition. A preferred composition with respect to high thermal shock resistance contains between about 10 and 40 weight percent zirconia and the remainder tungsten.

Although the invention has been described in terms of coatings, formed bodies, and coated bodies, it is to be understood that it is also susceptible of use in conjunction with other coatings and coated bodies. An alumina coating, for example, may first be applied to an article to protect it from high temperature. Normally, such an alumina coating would fail under flame test by disintegrating and chipping off due to the stresses induced by thermal shock in the coating. However, a tungsten-refractory metal oxide coating applied over the alumina coating protects it until it can heat up evenly to operating temperature. This substantially reduces the thermal shock effect on the alumina and decreases its tendency to chip. The tungsten-refractory metal oxide coating also provides good erosion protection.

In order to indicate a practical application of the present invention, the following illustration, simulating a rocket nozzle designed for an operating life of approximately one to two minutes, is set forth. An unprotected graphite rod, when subjected to a high temperature flame jet of supersonic velocity, failed due to severe erosion in about 30 seconds. However, an identical graphite rod coated with a 0.010-inch thick coating of tungsten containing 10 weight percent zirconia satisfactorily withstood the same high temperature flame jet of supersonic velocity impinging perpendicularly to its surface for 90 seconds and with only slight wear to the outer coating and no damage to the graphite.

In accordance with the invention the aforesaid tungsten-refractory oxide composition may be applied to an object by a high velocity, high temperature arc plating process such as described in copending patent applications S.N. 706,099 and 706,135, both abandoned for continuation-in-part application Serial No. 850,444, filed November 2, 1959. These processes are particularly useful since they provide substantial control over the final composition of the formed product. The non-transferred arc torch plating process disclosed in Serial No. 706,099 of R. M. Gage et al., filed December 31, 1957, is preferred since it does not require the workpiece to be in the electrical circuit and thus workpiece distortion is maintained at a minimum. In this coating process, the coating material is preferably fed in particle form through the hot gas of a wall-stabilized arc and then impinged at high velocity on the workpiece. The coating so produced constitutes a dense, impacted, adherent, lamellar structure which greatly contributes to its excellent high temperature protective properties. The coating composition when it impinges upon the surface of the base material is in a somewhat temporary plastic condition, which enables it to fill the surface pores of the base material without substantial interalloying or interdiffusion therewith, thus forming an unusually strong interlocking mechanical bond therewith. The coating, being formed by the high speed propulsion of a series of hot particles of the aforesaid composition, becomes interfused and cohesed with the previously applied particles to form a dense matte constituting the coating. The thus formed coating is characterized by a relatively low degree of porosity and a high resistance to rupture, spalling, and thermal shock.

In order to indicate still more fully the nature of the present invention, the following examples of typical procedures in the production and testing of formed and coated articles of the present invention are set forth, it being understood that these examples are presented as illustrative only and they are not intended to limit the scope of the invention.

*Example I*

An electric arc of 200 amperes and 60 v. (DCSP) was maintained between a ⅛ inch diameter thoriated tungsten stick electrode and a water-cooled copper nozzle electrode having a ⅛ inch diameter throat. Argon gas at 300 c.f.h flowed around the stick electrode and out through the nozzle electrode. The nozzle outlet was positioned ½ inch from a ⅜ inch diameter rotating carbon rod. A powder mixture containing equal amounts by weight of tungsten and zirconia was passed through the nozzle electrode at 30 gms./min. and impinged as a spray on the carbon workpiece until a coating 0.010 inch thick resulted. The thus coated carbon rod was then exposed to a jet of hot combustion gases traveling at 4000 ft./sec. resulting from the combustion at 2900° C. (5252° F.) of a mixture of acetylene and oxygen having an oxygen-carbon ratio of 1.4/1. The impingement angle was 90° and the exposure time was 90 seconds. The outer surface of the tungsten-zirconia coating showed only slight wear. No damage resulted to the carbon under-material. Unprotected carbon exposed to identical conditions was severely eroded. The above test simulates operating conditions in a rocket nozzle and indicates that nozzles protected with coatings of the present invention are admirably suited for such use.

*Example II*

In a test similar to the procedure described in Example I, tungsten powder containing 10 weight percent zirconia was passed through the nozzle electrode at about 30 gms./min. and impinged on a graphite rod until a coating 0.010 inch thick resulted. Thereafter, the coated graphite rod was exposed to hot combustion gases traveling at about 4000 ft./sec. at an impingement angle of 90° for approximately 90 seconds. The outer surface of the tungsten zirconia coating was slightly worn but indicated less wear and more resistance to thermal shock than the tungsten-zirconia coating of Example I.

*Example III*

Apparatus of the type described in Example I was also employed in this example and operated in a similar manner. Tungsten powder containing 10 weight percent alumina was passed through the nozzle electrode at about 30 gms./min. and impinged on a graphite workpiece until a coating 0.010 inch thick resulted. Under similar testing conditions to these conducted above in Examples I and II, the tungsten-alumina coating had some wear caused by high temperature erosion and the graphite was slightly damaged.

An unprotected carbon rod was severely oxidized and eroded by the test flame during a 90 second test period. A 0.010 inch thick coating of tungsten metal on a similar test piece was almost completely removed during the test period.

*Example IV*

Apparatus of the type described in Example I was employed and operated in a similar manner. Tungsten powder containing 10 weight percent zirconia was passed through the nozzle electrode at about 30 gms./min. and impinged on a brass pattern having the desired rocket nozzle contour until a coating about 0.050 to 0.060 inch thick resulted. This coated brass article was then immersed in an aqueous nitric acid solution until the brass was dissolved away from the coating. The product was a nozzle composed entirely of tungsten containing about 10 weight-percent zirconia. This nozzle then satisfactorily withstood the severe high velocity flame conditions similar to those previously described in Examples 1–3.

It is to be understood that modifications and variations may be effected without departing from the scope of this invention, which includes, among other things, a novel composition of matter, the method of applying a coating of same to an object and coated articles and bodies formed of the novel coating compositions.

What is claimed is:

1. A high temperature thermal shock and flame erosion resistant body having a lamellar coating of surface forming composition consisting of tungsten with between about 5 and 60 weight percent of a refractory metal oxide additive.

2. A body provided with a surface having resistance to high temperature thermal shock as well as to flame erosion formed by a lamellar coating consisting of tungsten with 10–40 weight percent zirconia.

3. A body provided with a surface having resistance to high temperature oxidation and flame erosion formed by a lamellar coating consisting of tungsten with 40–60 weight percent zirconia.

4. A body having a high temperature thermal shock and flame erosion resistant surface formed by a lamellar coating consisting of 10 weight percent zirconia and the remainder tungsten.

5. A body having a high temperature oxidation and flame erosion resistant surface formed by a lamellar coating consisting of approximately 50 weight-percent tungsten and 50 weight-percent zirconia.

6. A body having a high temperature thermal shock and flame erosion resistant surface formed by a lamellar coating consisting of tungsten with between about 5 and 35 weight percent alumina additive.

7. A method of making a thermal shock resistant and erosion resistant coating comprising impacting the surface to be coated with particles of a composition of between 5–60 weight percent of a refractory oxide and the remainder tungsten by passing the coating material in particle form through the hot gas of a wall-stabilized arc and then impinging the same on the workpiece at a supersonic velocity and high temperature to form a mechanical bond without substantial alloying with said surface, successively applying hot particles of said composition to interfuse and cohese with previously applied particles until a suitable thickness of coating is formed.

8. A body having mechanically bonded thereto without substantial alloying with said body, a thin adherent lamellar coating containing between 5 and 60 weight percent of at least one refractory oxide selected from the group consisting of zirconia and alumina, the remainder being tungsten and incidental impurities.

9. An article of manufacture which comprises a base material which is susceptible to damage by high temperature thermal shock and flame erosion, such base material being protected by a lamellar coating composition consisting of tungsten and between about 5 and 60 weight percent of a refractory metal oxide additive chosen from the group consisting of zirconia and alumina.

10. An article of manufacture which comprises a carbon base, such carbon being protected from damage by high temperature thermal shock and flame erosion by a lamellar coating composition consisting of tungsten containing between about 5 and 60 weight percent refractory metal oxide chosen from the group consisting of zirconia and alumina.

11. An article of manufacture which comprises a carbon base, such carbon being protected from damage by high temperature thermal shock and flame erosion by a lamellar coating composition consisting of tungsten containing between about 5 and 35 weight percent of alumina.

12. An article of manufacture which comprises a carbon base, such carbon being protected from high temperature oxidation and flame erosion by a lamellar coating of tungsten containing 40–60 weight percent of zirconia.

13. An article of manufacture which is resistant to damage by high temperature thermal shock and flame erosion, such article formed from an impacted composition consisting of tungsten containing between about 5 and 60 weight percent of a refractory metal oxide chosen from the group consisting of zirconia and alumina.

14. An article of manufacture which is resistant to damage by high temperature oxidation and flame erosion, such article having a lamellar coating formed of tungsten containing 40–60 weight percent of zirconia.

15. An article of manufacture resistant to damage by high temperature thermal shock and flame erosion, such article having a lamellar coating formed from a composition consisting of tungsten containing between about 5 and 35 weight percent alumina.

16. A formed body characterized by its high resistance to oxidation, erosion, and thermal shock at elevated temperatures such body having a lamellar coating comprising between 5 and 60 percent by weight of at least one refractory oxide selected from the group consisting of alumina and zirconia, and the remainder tungsten.

17. An article of manufacture which comprises a base material which is susceptible to damage by high temperature thermal shock and flame erosion, such base material being protected by a lamellar coating composition consisting of tungsten and between 10 and 40 weight percent of zirconia.

18. An article of manufacture which comprises a base material which is susceptible to damage by high temperature thermal shock and flame erosion, such base material being protected by a lamellar coating composition consisting of tungsten and 10 weight percent of zirconia.

19. An article of manufacture which is resistant to damage by high temperature thermal shock and flame erosion, such article formed of tungsten containing 10–40 weight percent of zirconia, said article having a high density lamellar structure.

20. An article of manufacture which is resistant to damage by high temperature thermal shock and flame erosion, such article formed of tungsten containing 10 weight percent of zirconia, said article having a high density lamellar structure.

21. An article of manufacture which comprises a carbon base protected from high temperature thermal shock and flame erosion by a lamellar coating of tungsten containing 10–40 weight percent of zirconia.

22. An article of manufacture which comprises a carbon base protected from damage by high temperature thermal shock and flame erosion by a lamellar coating of tungsten containing 10 weight percent of zirconia.

References Cited in the file of this patent

UNITED STATES PATENTS

| | | |
|---|---|---|
| 1,074,333 | Thowless | Sept. 30, 1913 |
| 1,180,264 | Lederer | Apr. 18, 1916 |
| 1,995,017 | Spanner et al. | Mar. 19, 1935 |
| 2,656,596 | Conant et al. | Oct. 27, 1953 |
| 2,672,426 | Grubel et al. | Mar. 16, 1954 |
| 2,694,646 | Wagner et al. | Nov. 16, 1954 |
| 2,707,691 | Wheildon | May 3, 1955 |
| 2,714,563 | Poorman et al. | Aug. 2, 1955 |
| 2,752,665 | Streicher | July 3, 1956 |
| 2,775,531 | Montgomery et al. | Dec. 25, 1956 |
| 2,789,341 | Youssov | Apr. 23, 1957 |
| 2,862,512 | Rex | Mar. 11, 1958 |
| 2,902,756 | Cavanaugh | Sept. 8, 1959 |
| 2,903,788 | Pryslak | Sept. 15, 1959 |

FOREIGN PATENTS

| | | |
|---|---|---|
| 20,227 | Great Britain | 1907 |